United States Patent Office 3,027,405
Patented Mar. 27, 1962

3,027,405
N-(ALKYLARYLSULFONYL)-AMINO ACIDS AND SALTS THEREOF
John D. Spivack, Spring Valley, Janet B. Peterson, Yonkers, and Harry Kroll, Bronx, N.Y., assignors to Geigy Chemical Corporation, Ardsley, N.Y., a corporation of Delaware
No Drawing. Filed July 29, 1959, Ser. No. 830,191
9 Claims. (Cl. 260—501)

This application is a continuation-in-part of copending application, Serial No. 463,842, filed October 21, 1954 (now U.S. Patent No. 2,908,648).

The invention pertains to a new class of compounds and to the synthesis thereof. These compounds, chemically, may be designated N-alkylarylsulfonyl-amino acids which correspond to the empirical formula

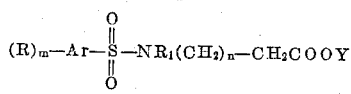

wherein each R represents an alkyl group of 8 to 24 carbon atoms inclusive; Ar represents an aryl group which may e.g. be a phenyl, naphthyl, anthracyl, phenanthryl or chrysyl group, etc.; $R_1$ represents a hydrogen atom or an alkyl, or carboxyalkyl group; $m$ represents 1 or 2; $n$ represents 0, 1 or 2; and Y represents hydrogen or a salt-forming group.

The present invention relates more particularly to the synthesis of N-(n-dodecylbenzenesulfonyl) sarcosine and of dodecylbenzenesulfonyl iminodiacetic acid and their salts. The present invention also relates to the salts derived from (N-alkylarylsulfonyl) amino acids of the above empirical formula type and organic or inorganic bases. Thus Y in the above empirical formula may be derived from ammonia, primary, secondary and tertiary alkyl amines, primary, secondary and tertiary aromatic amines, as well as the heterocyclic bases, such as pyridine, piperidine, pyrimidine, pyrazole, pyrazoline, quinoline, imidazoline, etc. Y may also be metals, for example, members of Groups I, II, III, IV and VIII of Mendeléeff's Periodic Classification of the Elements. The alkali metal and alkaline earth metal salts have particular interest because of their surface active properties in aqueous systems. The alkyl amine salts of the above type N-alkylarylsulfonyl amino acids have particular utility because of their surface-active properties in aqueous and organic liquids.

It furthermore relates to the synthesis thereof by reacting the amino acids, sarcosine and iminodiacetic acid, respectively, in an alkaline medium with n-dodecylbenzenesulfonyl chloride, the N-alkylarylsulfonyl amino acid being obtained if desired, from its salt by acidfication in a subsequent step. This reaction is applicable to the condensation of other natural or synthetic amino acids of the above formula type by this reaction. It also relates to the synthesis thereof by other reactions as set out in equations hereinafter. Of these, and also exemplified in the disclosure especially important is the condensation of dimethyl iminodiacetate hydrochloride with n-dodecylbenzenesulfonyl chloride in the presence of triethylamine.

The members of the class of compounds of the present invention may be regarded as derivatives of the amino acids, for example, of glycine:

NH₂CH₂COOH of α- and β-alanine:

CH₃CH(NH₂)COOH and

CH₂(NH₂)COOH of sarcosine or methyl glycocoll:

CH₃NHCH₂COOH of iminodiacetic acid:

HOOC—H₂C—NH—CH₂—COOH of aspartic acid:

HOOC.HC(NH₂)CH₂COOH of glutamic acid:

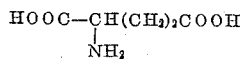

etc.

Example of the type of compounds included within the present invention are

N-(dodecylbenzenesulfonyl) glycine,
N-(dodecylbenzenesulfonyl) sarcosine,
N-(dodecylbenzenesulfonyl) iminodiacetic acid,
N-(dodecylbenzenesulfonyl) glutamic acid,
N-(dodecylbenzenesulfonyl) alanine,
N-(dinonylnaphthalenesulfonyl) glycine,
N-(dinonylnaphthalenesulfonyl) sarcosine,
N-(dinonylnaphthalenesulfonyl) iminodiacetic acid,
N-(dinonylnaphthalenesulfonyl) glutamic acid,
N-(dodecylnaphthalenesulfonyl) glycine,
N-(octadecyl anthracenesulfonyl) sarcosine,
N-(octyl xylyl) sarcosine and the like.

The sulfonated amino acids of the general type of this invention can be prepared in a number of ways, for example, as outlined in Equations A, B, C and D below:

(A)
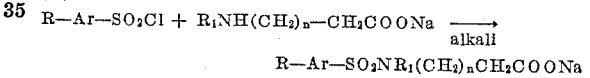

(B)
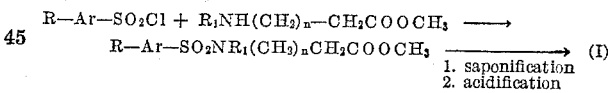

(C)
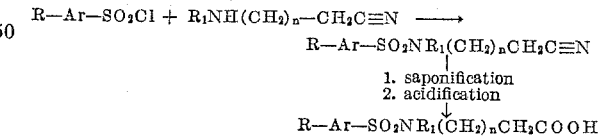

(D)
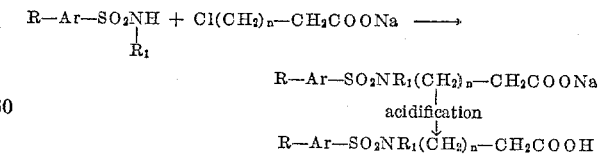

The reactants in the process of manufacture may be relatively pure single compounds, for example, pure alkylarylsulfonyl chloride or the sulfonyl amide (see empirical formula of the respective first mentioned reactant in Equations A and D), and pure amino acid salt, -ester, or -nitrile conforming to the second respective reactant in the empirical formula set forth in equations of processes A, B and C, and the pure chlorocarboxylic acid salt which is the second reactant in the process of Equation D. Or the reactants may be mixtures resulting in a product consisting of a mixture of compounds, all represented by the formula $$R-Ar-SO_2NR_1(CH_2)_nCHCOOY$$

the symbols in which are defined above.

In further explanation, it may be stated that the R—Ar grouping set forth above may be derived from straight-chain or branched-chain octyl, decyl, dodecyl, tetradecyl, hexadecyl, or octadecyl derivatives of either benzene, naphthalene, anthracene or chrysene or from mixtures thereof. The R—Ar grouping may also be derived from the reduction of fatty acylated or alkenylated aromatic compounds. The products obtained by processes (B) and (C) outlined above may also have more or less unsaponified ester or nitrile groupings present therein in addition to free carboxyl groups or salts thereof.

The new products of our invention have surface active properties in both aqueous and non-aqueous media. For example, they have wetting, foaming and detergent properties when used in water, and are therefore useful inter alia as wetting agents, foaming agents and as detergents in aqueous media. They are also effective rust preventatives when used in aqueous or non-aqueous media such as oils, anti-freeze mixtures, metal pickling solutions, etc. They can also be used in the protection of metals, such as iron, in humid atmospheres.

The following specific examples serve to illustrate the invention. It should be understood that it is not limited thereto, nor to the reactants, nor the proportions nor the manipulations described therein.

EXAMPLE I

N-(n-Dodecylbenzenesulfonyl) Sarcosine (A) AND (B) PREPARATION OF N-DODECYLBENZENE-SULFONYL CHLORIDE Seventy-four grams (74 g.) (0.30 mole) of n-dodecylbenzene ($N_d^{25}$=1.483, boiling at 4.2 mm. Hg pressure at 165–170° C.) was dissolved in 200 milliliters of methylene chloride in a 1-liter flask fitted with a mechanical stirrer, an air condenser, thermometer and dropping funnel; the entire apparatus was protected from moisture by calcium chloride drying tubes on the condenser and the dropping funnel. The solution was cooled to 10° C. by an external bath. Chlorosulfonic acid (73 g.) (0.63 mole) was added thereto over a period of 35 to 40 minutes while its temperature was kept at −10° C. to −7° C. The reaction mixture became dark brown in color. It was stirred an additional two hours while maintaining its temperature at 0° C., followed by two more hours at 20° C., whereupon it was let stand at room temperature overnight, i.e., for about fifteen hours. The reaction mixture was poured into 300 grams of ice, and 300 milliliters of diethyl ether were added, intimately mixed therewith, whereupon after stratification the water layer was separated from the upper or ether layer. The water layer was extracted with an additional 300 milliliters of ether. The combined ether extracts were extracted with 300 milliliters of a 5% aqueous solution of sodium bicarbonate also containing 10% by weight of sodium chloride to remove residual inorganic acids. The ether in the purified ether layer was removed by distillation at atmospheric pressure followed by reduced pressure. The residue was taken up in 500 milliliters of acetone and filtered free of inorganic salts. Analysis of the residue (A) from the acetone distillation indicated that product (A) contained about 8.3% of n-dodecylbenzenesulfonyl chloride, the remainder being n-dodecylbenzene sulfonic acid.

Phosphorus pentachloride (19.3 grams) was added gradually with occasional shaking to product (A) amounting to 28 grams, in an Erlenmeyer flask fitted with a drying tube. After effervescence stopped, the reaction mixture was warmed on a water bath for about 30 minutes. The product was then poured into ice, and extracted with 200 milliliters of ether. The ether extract was thereupon washed with water and then dried over anhydrous sodium sulfate. After being separated, ether was removed by evaporation. The residue, which was product (B), was a viscous, reddish oil, the analysis of which indicated that it consisted of 96%–97% of n-dodecylbenzenesulfonyl chloride.

(C) PREPARATION OF N-(n-DODECYLBENZENESULFONYL) SARCOSINE FROM PRODUCT (B) SUPRA

Sarcosine (3.6 grams) (0.041 mole) was dissolved in 41 milliliters of 1.0 N solution of sodium hydroxide in water to form its sodium salt, and the solution cooled to 15° C. A dioxane solution of n-dodecylbenzenesulfonyl chloride (14.0 grams of product (B) described above dissolved in 50 milliliters of dioxane) and 41 milliliters of 1.0 N aqueous sodium hydroxide were added dropwise simultaneously to the aqueous solution of the sodium salt of sarcosine over a period of 20 minutes. The reaction mixture was stirred an additional two hours at room temperature; this contained the sodium salt of N-(n-dodecylbenzenesulfonyl) sarcosine with by-products of the reaction. It was then made acid to pH 2 with 6 N aqueous hydrochloric acid, after which the solution was extracted with ether. This extract was heated to distill off the ether. The residue (12.8 grams) was crystallized from n-hexane, and there was obtained a white crystalline product melting at 110–111° C. (uncorrected). The crystalline product was substantially pure N-(n-dodecylbenzenesulfonyl) sarcosine having a neutralization equivalent weight of 400. The calculated neutralization equivalent weight for N-(n-dodecylbenzenesulfonyl) sarcosine is 397.

The sodium salt is prepared by neutralization of this pure crystalline product and evaporation of the solvent or in an impure form admixed with sodium chloride by evaporation of the water and dioxane after the coupling reaction. The potassium salt is prepared in the same manner by heating with potassium hydroxide instead of sodium hydroxide.

EXAMPLE II

N-(n-Dodecylbenzenesulfonyl) Iminodiacetic Acid

Dimethyl iminodiacetate hydrochloride (7.7 grams) (0.039 mole) was dissolved in 100 milliliters of chloroform contained in a 300 milliliter capacity flask which was fitted with a condenser, stirrer and dropping funnel suitably fitted with calcium chloride drying tubes to protect the reaction mixture from moisture. Triethylamine (8.2 grams) (0.082 mole) was added all at once, and the reaction mixture cooled to room temperature. A dioxane solution of n-dodecylbenzenesulfonyl chloride (14 grams) (0.041 mole) dissolved in 50 milliliters of dioxane was added dropwise to the reaction mixture while undergoing stirring, over a period of 25 minutes, and this mixture was stirred at room temperature for an hour; it was then heated at reflux for an additional hour. The chloroform solution of the reaction product was washed successively with water and 5% aqueous sodium chloride solution, and then dried over anhydrous sodium sulfate. It was then decanted from the drying agent. The residue, after evaporation of chloroform was heated on a steam bath with 100 milliliters of 1 N sodium hydroxide solution in water for two hours. In this last step the dimethyl N-(n-dodecylbenzenesulfonyl) iminodiacetate was saponified. The product was the sodium salt of N-(n-dodecylbenzenesulfonyl) iminodiacetic acid in solution. The alkaline solution was extracted with 100 milliliters of ether to remove unsaponified material. The aqueous solution was then made to pH 1 and extracted with 150 milliliters of ether, after which the ether layer was separated and dried over anhydrous sodium sulfate. After separation from the dehydrating agent, ether was distilled off. The residue from the ether solution, amounting to 9.36 grams, was recrystallized from 5:1 hexane-ethyl acetate solvent and yielded white crystals melting at 146–147° C.

Potentiometric titration with 0.10 N methanolic potassium hydroxide of the sample dissolved in dimethyl formamide: calculated neutralization equivalent weight for $C_{22}H_{35}O_6NS$, N-(n-dodecylbenzenesulfonyl) iminodiacetic acid, first end point 441; second end point 220.5; found, first end point 449; found, second end point 219.5.

These crystals of N-(n-dodecylbenzenesulfonyl) iminodiacetic acid, by neutralization with aqueous sodium hydroxide or potassium hydroxide upon heating are converted to the corresponding sodium or potassium salts. Or in a less pure form the solution just prior to acidification described supra can be evaporated to dryness.

EXAMPLE III

*(N-Dodecylbenzenesulfonyl) Sarcosine [Technical]*

(A) PREPARATION OF DODECYLBENZENESULFONYL CHLORIDE

This compound was prepared in the following manner from a commercial grade of dodecylbenzene:

One-half mole of dodecylbenzene (123 grams) was dissolved in 200 milliliters of methylene chloride in a 1-liter flask fitted with a mechanical stirrer, an air-condenser, thermometer and dropping funnel; the entire apparatus was protected from moisture by calcium chloride drying tubes on the condenser and dropping funnel. After cooling the methylene chloride solution to −8° C. by an external bath, chlorosulfonic acid (145.5 g.) (1.2 moles) was added thereto, dropwise, over a period of one hour and fifty minutes while the temperature of the reaction mixture was maintained between −9 and −2° C. The reaction mixture became increasingly dark brown in color as the addition of chlorosulfonic acid proceeded. It was stirred an additional two hours while maintaining its temperature at 0° C., whereupon it was allowed to stand at room temperature for about 16 hours. It was then poured into a mixture of 500 milliliters of 15% aqueous sodium chloride and about 300 grams of ice, and stirred well. Diethyl ether in an amount of 300 milliliters was added, and intimately mixed with the reaction mixture, whereupon after stratification the upper organic layer was separated and washed with several 75 milliliter portions of water containing 5% sodium bicarbonate and 10% sodium chloride. The ether-methylene chloride solution was dried over solid anhydrous sodium sulfate overnight, separated from the latter, after which the organic solvent mixture was removed by distillation. The residue was a dark brown liquid, insoluble in water; it weighed 120 grams. The yield of crude product was therefore about 70% of theory.

Analysis of the crude sulfonyl chloride gave the following results:

| | Wt. percent |
|---|---|
| Dodecylbenzenesulfonylchloride | 87.1 |
| Dodecylbenzenesulfonic acid | 14.8 |

The analytical results indicated that the product as described above could be used as a reactant in this and the next example.

(B) PREPARATION OF N-(DODECYLBENZENESULFONYL) SARCOSINE FROM PRODUCT (A) SUPRA

Nine and two-tenths grams (9.2 g.) (0.10 mole) of sarcosine which was 96.6% pure was dissolved in 100 milliliters of water containing 4.1 grams (0.10 mole) of sodium hydroxide. Dodecylbenzenesulfonyl chloride described in (A) above (39.2 grams) (0.10 mole) was dissolved in dioxane so that a volume of 70 milliliters was obtained. The so-obtained dioxane solution and 70 milliliters of aqueous alkali (containing 4.7 grams of sodium hydroxide) were added simultaneously to the stirred solution of the sodium salt of sarcosine over a period of 30 minutes, the temperature of the reaction varying from 28° C. to 37° C. The reaction mixture was stirred at 45° C. for one hour and then let stand at room temperature for about sixteen hours. This contained the sodium salt of N-dodecylbenzenesulfonyl sarcosine (technical). It was then made acid to pH 3 with 6 N aqueous hydrochloric acid after which the solution was extracted with two 200 milliliter portions of diethyl ether. The ether layer was dried over anhydrous sodium sulfate. After this dehydration step and separation from the sodium sulfate, ether was removed by distillation. The residue was an amber-like gummy mass containing primarily N-(dodecylbenzenesulfonyl) sarcosine.

EXAMPLE IV

*Reaction Product of Technical Dodecylbenzenesulfonyl Chloride With Iminodiacetic Acid*

Iminodiacetic acid (2 g.) (0.015 mole) and triethylamine (4.55 g.) (0.045 mole) were mixed in boiling chloroform, and after cooling to room temperature the 90% dodecylbenzenesulfonyl chloride, prepared by Example III(A) supra, in an amount of 5.15 grams (0.0105 mole) was added. The mixture was shaken vigorously for 20 minutes, then allowed to stand at room temperature overnight (about 16 hours). It was then refluxed for an hour before filtering the insoluble material. The chloroform was removed by distillation in vacuo. The residue, which represented the triethylamine salt of technical (N - dodecylbenzenesulfonyl) iminodiacetic acid, was acidified to pH 1 with aqueous 6 N hydrochloric acid after which the solution was extracted several times with ether. The ether extracts were washed with dilute hydrochloric acid and water and thereafter dried over anhydrous sodium sulfate. After decantation from the dehydrating agent, the ether was removed by distillation. The residue was an amber colored, semi-hardened mass, weighing 1.4 grams, and containing primarily (N-dodecylbenzenesulfonyl) iminodiacetic acid.

EXAMPLE V

*Reaction Product of Dodecylbenzenesulfonyl Chloride With Dimethyliminodiacetate Hydrochloride*

Dimethyliminodiacetate hydrochloride (20.0 grams) (0.10 mole) was dispersed in 200 milliliters of chloroform, and 24.3 grams of triethylamine (0.24 mole) was added rapidly while the chloroform dispersion was stirred. Dodecylbenzenesulfonyl chloride in the same molar amount as the dimethyliminodiacetate hydrochloride, namely 0.10 mole, was dissolved in 125 milliliters of chloroform and added dropwise over a period of one hour to the stirred chloroform solution of dimethyliminodiacetate. The turbid reaction mixture was stirred at room temperature for an additional hour, then washed successively with water and 5 percent aqueous sodium chloride solution, after which the chloroform solution was dried over anhydrous sodium sulfate. After separation from the sodium sulfate the chloroform was distilled. The residue was dissolved in 300 milliliters of 50% aqueous methanol containing 17 grams of potassium hydroxide and warmed on the steam bath for one hour with occasional stirring. The reaction solution of the potassium salt of (N-dodecylbenzenesulfonyl) iminodiacetic acid was diluted with an equal volume of water, made acid to pH 1 with 6 N aqueous hydrochloric acid and extracted with 200 ml. portions of ether. The ether solution of the free (N-dodecylbenzenesulfonyl) iminodiacetic acid was then dried over anhydrous sodium sulfate. After decantation from the drying agent the ether was distilled off. The residue from ether weighed 32.9 grams and had a neutralization equivalent of 415. The product is a mixture of (N-dodecylbenzenesulfonyl)-iminodiacetic acid and its methyl esters.

EXAMPLE VI

*Alkylamine Salts of Products of Examples I to V Inclusive*

The alkyl amine salts (or complexes) of the products of Examples I, II, III, VI and V, supra, were prepared, the alkylamine used being "Primene JM-R."

This trademark designation refers to a mixture of highly branched, primary amines with the tertiary-alkylamine (tertiary carbylamine) structure, in which the primary amino nitrogen is directly attached to a tertiary carbon atom. It is composed principally of amines from eighteen to twenty-four carbon atoms; the predominant portion is represented by the formula $$t\text{-}C_{18-24}H_{37-19}NH_2$$

Some of the other physical properties of "JM–R" are: Mol. wt., principally 269–353; sp. gr. at 25° C.=0.828; refractive index at 25° C.=1.455; boiling range 5–95% at 275–340° C. (765 mm.); neutralization equivalent 301; and flash point 250° F.

The oil used to prepare the respective solutions of the alkylamine complexes of the products of Example I, II, III, IV and V, supra, was a solvent-refined and filtered non-additive grade lubricating mineral oil of 150 Saybolt Universal seconds of viscosity at 100° F.

The following procedure was used in preparing the alkylamine salts of each of the N-alkylarylsulfonyl amino acids of the above Examples I to V, inclusive:

A 1% concentrate of the products of Examples I to V, inclusive, were prepared by dispersing 0.5 gram of each of these products in 50 grams of oil by heating them in the oil on an electric hot plate to about 100° C. with vigorous agitation. A 1% concentration of "Primene JM–R" was prepared by dissolving 0.5 gram of this alkylamine in 50 grams of oil. Solutions of the alkylamine complexes of the products of Examples I to V, inclusive, were prepared by adding the 1% alkylamine concentrate to 1% alkylarylsulfonyl amino acid complex with stirring and heating at 60° C. for about ten minutes.

Although the present invention has been described with certain preferred embodiments, it is to be understood that modifications may be made without departing from the spirit and scope thereof as those skilled in the art will understand. Such variations are considered to be within the purview and scope of the appended claims.

Having thus disclosed the invention, what is claimed is:

1. A compound of the formula

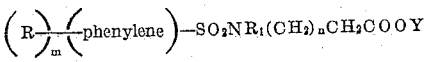

wherein each $R$ represents an alkyl group with 8–24 carbon atoms, $R_1$ represents a substituent selected from the group consisting of hydrogen, lower alkyl, and lower carboxyalkyl, $m$ represents an integer from 1 to 2, $n$ represents an integer from 0 to 2, and $Y$ represents a member selected from the group consisting of hydrogen, alkali metal, and alkylamino having 18 to 24 carbon atoms in the alkyl moiety thereof.

2. N-(n-dodecylbenzenesulfonyl) sarcosine.
3. N-(n-dodecylbenzenesulfonyl) iminodiacetic acid.
4. The sodium salt of N-(n-dodecylbenzenesulfonyl) sarcosine.
5. The sodium salt of N-(n-dodecylbenzenesulfonyl) iminodiacetic acid.
6. The potassium salt of N-(n-dodecylbenzenesulfonyl) iminodiacetic acid.
7. The triethylamine salt of N-(n-dodecylbenzenesulfonyl) iminodiacetic acid.
8. An alkylamine salt of N-(n-dodecylbenzenesulfonyl) sarcosine, the alkyl moiety of the amine containing from 18–24 carbon atoms.
9. An alkylamine salt of N-(n-dodecylbenzenesulfonyl) iminodiacetic acid, the alkyl moiety of the amine containing from 18–24 carbon atoms.

References Cited in the file of this patent

UNITED STATES PATENTS

| | | |
|---|---|---|
| 2,578,725 | Michel et al. | Dec. 18, 1951 |
| 2,602,760 | Michel et al. | July 8, 1952 |
| 2,692,857 | Michel et al. | Oct. 26, 1954 |
| 2,704,264 | Michel et al. | Mar. 15, 1955 |
| 2,908,648 | Spivack et al. | Oct. 13, 1959 |

UNITED STATES PATENT OFFICE
CERTIFICATE OF CORRECTION

Patent No. 3,027,405                          March 27, 1962

John D. Spivack et al.

It is hereby certified that error appears in the above numbered patent requiring correction and that the said Letters Patent should read as corrected below.

Column 1, line 72, for "$CH_2(NH_2)COOH$" read -- $NH_2CH_2CH_2COOH$ --.

Signed and sealed this 24th day of July 1962.

(SEAL)
Attest:

ERNEST W. SWIDER
Attesting Officer

DAVID L. LADD
Commissioner of Patents